United States Patent [19]

Herrington et al.

[11] 4,432,960
[45] Feb. 21, 1984

[54] THERMOCHEMICAL METHOD FOR PRODUCING HYDROGEN FROM HYDROGEN SULFIDE

[75] Inventors: Daniel R. Herrington, Bainbridge; Philip L. Kuch, Aurora, both of Ohio

[73] Assignee: The Standard Oil Co., Cleveland, Ohio

[21] Appl. No.: 448,465

[22] Filed: Dec. 10, 1982

[51] Int. Cl.³ .............................................. C01B 17/50
[52] U.S. Cl. ............................... 423/539; 423/648 R; 423/655
[58] Field of Search ................... 423/655, 648 R, 539, 423/416, 415 A

[56] References Cited

PUBLICATIONS

*Accounts of Chemical Research*, P. C. Ford, 14 (2), 31 (Feb. 1981).
*Journal of the American Chemical Society*, Allen D. King et al., 102 (3), 1028 (Jan. 1980).
*Transcripts of the Faraday Society*, M. M. Sharma, 61, (508), p. 681, (1965).
*Journal of the American Chemical Society*, Edgar C. Baker et al., 102, (3), 1020 (Jan. 1980).

*Primary Examiner*—Earl C. Thomas
*Assistant Examiner*—Jackson Leeds
*Attorney, Agent, or Firm*—J. E. Miller, Jr.; L. W. Evans

[57] ABSTRACT

Hydrogen is produced from hydrogen sulfide by a 3-step, thermochemical process comprising:
(a) contacting hydrogen sulfide with carbon dioxide to form carbonyl sulfide and water,
(b) contacting the carbonyl sulfide produced in (a) with oxygen to form carbon monoxide and sulfur dioxide, and
(c) contacting the carbon monoxide produced in (b) with water to form carbon dioxide and hydrogen.

15 Claims, 1 Drawing Figure

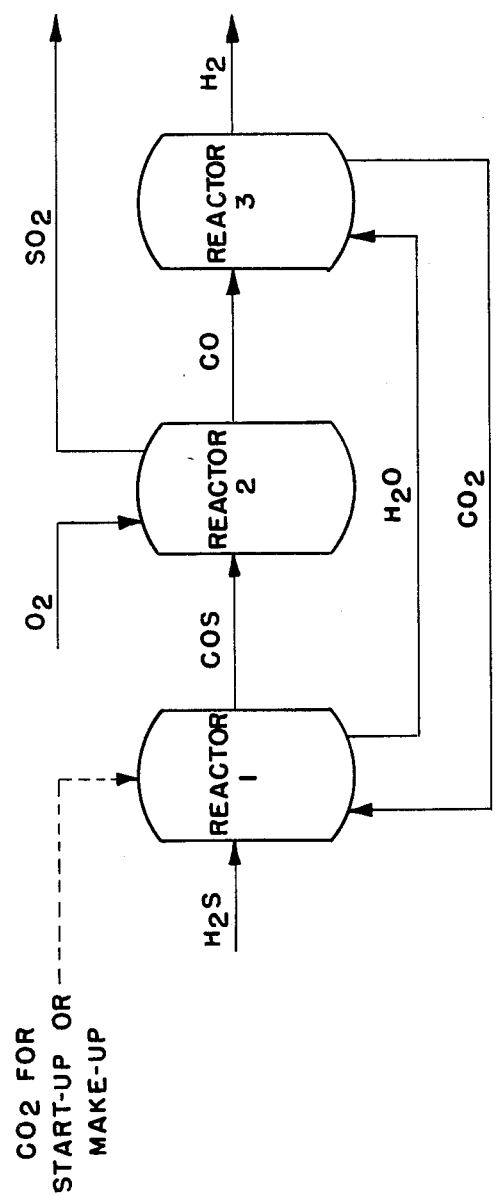

THERMOCHEMICAL METHOD FOR PRODUCING HYDROGEN FROM HYDROGEN SULFIDE

BACKGROUND OF THE INVENTION

1. Field of the Invention

This invention relates to a method of producing hydrogen. In one aspect, the invention relates to a method of producing hydrogen from hydrogen sulfide while in another aspect the invention relates to a 3-step thermochemical method where carbonyl sulfide, oxygen and water are reaction intermediates.

2. Description of the Prior Art

Hydrogen is an extremely useful resource. It finds applications in such diverse activities as the production of ammonia, petroleum refining, as a reducing agent for organic synthesis, production of high purity metals, and on and on. Moreover, some authorities believe that hydrogen may be the ultimate clean energy source.

Besides being such a useful resource, hydrogen is also the most abundant resource in the universe. As such, hydrogen can be derived from any one of a number of different sources although reaction of steam with natural gas (steam reforming) is presently the dominant industrial method of production. Other methods include the partial oxidation of hydrocarbons, the dissociation of ammonia, catalytic reforming of petroleum, reaction of iron and steam, electrolysis of water and the thermochemical decomposition of water. Most of these methods rely on relatively valuable feed sources while those that rely upon water are either very energy intensive or relatively undeveloped. As such, hydrogen remains a relatively expensive commodity and there is a continuing interest in identifying alternative feedstocks and processes for its production.

Hydrogen sulfide is a colorless, highly toxic gas with an offensive odor and is produced in large qwuantities as a byproduct of petroleum refining. While it has various industrial uses, such as the purification of hydrochloric and sulfuric acid and as a reagent in the manufacture of elementary sulfur, it is generally considered a low value commodity and a disposal problem. As such, there is a continuing interest in identifying new applications for this material.

SUMMARY OF THE INVENTION

According to this invention, hydrogen is produced from hydrogen sulfide by a 3-step thermochemical method comprising:

(a) contacting hydrogen sulfide with carbon dioxide to form carbonyl sulfide and water, (b) contacting the carbonyl sulfide produced in (a) with oxygen to form carbon monoxide and sulfur dioxide, and (c) contacting the carbon monoxide produced in (b) with water to form carbon dioxide and hydrogen.

This method not only produces valuable hydrogen from low value hydrogen sulfide but requires only low cost, abundant and safe carbon dioxide to initiate the chemistry. Once the process reaches a stabilized state, only hydrogen sulfide and oxygen (air) are consumed.

BRIEF DESCRIPTION OF THE DRAWING

The FIGURE is a schematic diagram of a simplified flow scheme of one embodiment of this invention.

DETAILED DESCRIPTION OF THE INVENTION

Overview

The method of this invention can be described by the following set of reactions:

| | |
|---|---|
| $H_2S + CO_2 \rightleftarrows COS + H_2O$ | (I) |
| $COS + O_2 \rightarrow CO + SO_2$ | (II) |
| $CO + H_2O \rightleftarrows CO_2 + H_2$ | (III) |
| $H_2S + O_2 \rightarrow H_2 + SO_2$ | (IV) |

While all of these reactions are known, including the net reaction (1 V), the hallmark of this invention is their combination to produce hydrogen from hydrogen sulfide with a net consumption of only hydrogen sulfide and oxygen.

The drawing illustrates a simplified flow scheme of one embodiment of the overall process. Hydrogen sulfide and carbon dioxide are fed to a first reactor where carbonyl sulfide and water are produced. The products are separated with the carbonyl sulfide being fed to a second reactor where it is contacted with oxygen to produce carbon monoxide and sulfur dioxide. The carbon monoxide is fed to a third reactor where it is contacted with the water product of the first reactor to produce hydrogen and carbon dioxide. The sulfur dioxide produced in the second reactor is recovered for further processing, e.g. for conversion to elemental sulfur in a Claus unit or for conversion to sulfuric acid by being oxidized in an aqueous solution. The carbon dioxide produced in the third reactor is recycled to the first reactor and once a steady state is achieved, the initial feed of carbon dioxide to the first reactor can be discontinued or added only as necessary to compensate for carbon dioxide loss inherent (leaks, incomplete separation of product, etc.) to the process. The hydrogen produced in the third reactor is recovered and purified as necessary.

Reaction I

As noted earlier, this is a known reaction and it can be conducted in either the liquid or vapor phase. See *Transcripts of the Faraday Society*, M. M. Sharma, 61 (508), page 681 (1965) and *Journal of Catalysis*, Akimoto and Dalla Lana, 62, 84 (1980). Typically this reaction is conducted in the vapor phase within a temperature range of 20°-800° C., preferably between 100°-700° C. and within a pressure range of 0-3,000 psig, preferably between 0-500 psig. Since stoichiometric amounts of carbon dioxide and hydrogen sulfide are required for this reaction, the mole ratio of carbon dioxide to hydrogen sulfide is typically at least 1:1 but an excess of one of the reactants, preferably carbon dioxide, is generally fed to the reactor to shift the equilibrium to favor carbonyl sulfide production.

Although this reaction can be conducted noncatalytically, preferably the reaction is conducted in the presence of a catalyst, typically an acidic catalyst such as a Lewis or Bronsted acid. Representative of these catalysts are the oxides and/or sulfides of the Group 6b and 7b metals, optionally promoted with one or more metals or metal compounds from Groups 7b, 8, 1a, 1b, 2b, etc., of the Periodic Table (as published in the *Handbook of Chemistry and Physics*, 61 Ed., CRC Press (1980-81). These catalysts can take any physical form, e.g. tablets, pellets, powder, extrudates, soluble (useful in homogenous liquid phase reactions), etc. and can be either supported or unsupported. Representative supports include alumina and/or silica, zirconium oxide, thorium oxide, titantium oxide, and the like. If supported, the catalyst can be either coated onto or impregnated into the support and in the case of the latter, typically such that the catalyst is present in an amount of at least one weight percent, based on the combined weight of the support and the catalyst, preferably in an amount of at least about 5 weight percent. In the case of the former, the catalyst is present in an amount of at least 5, preferably at least 15, weight percent.

When the reaction is conducted in the vapor phase, the reaction can be conducted either in a fixed-or fluid-bed mode with a contact time in the range of 0.1–20 seconds and preferably between about 1–10 seconds, the exact time dependent on such variables as catalyst composition, temperature, reactants, etc. When the reaction is conducted in the liquid phase, either a soluble or insoluble catalyst can be used with a sufficient residence time that allows the reaction to reach equilibrium. Exemplary conditions for this mode of reaction are described by M. M. Sharma, supra.

Reaction II

The oxidation of carbonyl sulfide to carbon monoxide and sulfur dioxide is also a known reaction. See *Journal of the Chemical Society*, Bawn C. E. H., 1933, 145 and *Combustion and Flame*, Cullis, C. R. and Mulcahy, M. F. R., 18, 225 (1972). Typically this reaction is conducted in the vapor phase at a temperature between about 200°–500° C., preferably between about 250°–350° C., and at a pressure between about 0–1,000 psig, preferably between about 0 and 500 psig. Stoichiometric amounts of carbonyl sulfide and oxygen are required but since this reaction is not equilibrium limited as reactions I and III, generally little if any benefit is gained from having one of the reactants present in an excess. Contact time will vary with the process conditions but typically in a fixed-bed reactor a contact time between about 1 and about 20, but preferably between about 2 and about 10, seconds is used.

Since carbonyl sulfide is a highly reactive compound, its oxidation generally does not require the presence of a catalyst. However, if desired a catalyst, such as quartz chips, can be employed to ensure smooth combustion, high conversions and/or good selectivities.

Reaction III

This reaction is the well known water gas shift reaction. It requires little additional comment here. The reaction can be conducted in solution using homogeneous catalysis or in the vapor phase using heterogeneous catalysis. The reaction conditions and types of available catalysts are well known and both are extensively described in the literature. See for example *Catalytic Review—Scientific Engineering*, D. S. Newsome, 21 (2), 275 (1980); *Accounts of Chemical Research*, P. C. Ford, 14 (2), 31 (February 1981); U.S. Pat. No. 3,580,840; J.A.C.S., King, Jr. et al., 102 (3), 1028 (January 1980); and J.A.C.S., Baker et al., 102 (3), 1020 (January 1980). As earlier noted, this reaction is also equilibrium limited and thus it is usually desirable to employ techniques that shift the equilibrium to the right.

Process Advantages

Not only does this invention provide hydrogen from a relatively inexpensive source material, but it does so in a highly efficient manner. Oxygen is the only other reactant consumed and sulfur dioxide is the only other product produced, a product that has various known applications. Only low cost carbon dioxide is required to initiate the chemistry of this invention and it and the other reaction intermediates, i.e. carbonyl sulfide and carbn monoxide, are either decomposed or recycled within the process cycle. Moreover, the heat released from the exothermic reaction of II can be used to partially heat the reactors in reactions I and III.

The following examples are illustrative of certain embodiments of this invention. Unless indicated to the contrary, all parts and percentages are by weight.

SPECIFIC EMBODIMENTS

Reaction I

Examples 1–5 describe the preparation of a catalyst used for the reaction of hydrogen sulfide and carbon dioxide.

EXAMPLE 1

A 40 g sample of ⅛ in. diameter Alundum ® spheres (alumina) was treated with 3.5 g $H_2O$ and rolled in a rolling mill for 30 min. Following this treatment, 10 g $CoMoO_4$ was added in four approximately equal portions, rolling 15–20 minutes after each addition. The resulting coated catalyst was dried overnight at 100° C.

EXAMPLE 2

A 30 g sample of $\gamma$-$Al_2O_3$ was stirred in the presence of 13 ml $H_2O$ containing 0.5 g $Cu(NO_3)_2.3H_2O$, 1.52 g $Zn(NO_3)_2.6H_2O$, and 1.81 g $(NH_4)_6Mo_7O_{27}.4H_2O$. The sample was dried at 125° C. for 4 hours and then treated with two equal portions of a solution consisting of 2.0 g $CsNO_3$ in 26 ml $H_2O$. The sample was dried for 4 hours at 125° C. after the first addition and overnight at 125° C. after the second addition. The sample was then treated with 13 ml of $H_2O$ containing 0.99 g $MnCl_2.4H_2O$ and again dried at 125° C. Finally, the sample was treated with 8 ml acetone containing 5.64 g $SnCl_2.2H_2O$ and dried at 125° C. The resulting catalyst had a composition which can be represented as 90 wt % $CsCu_{0.2}Zn_{0.5}Mn_{0.5}MoO_x$/10 wt% $Sn/Al_2O_3$.

EXAMPLE 3

A 44 g sample of $\gamma$-$Al_2O_3$ was treated with 13 ml $H_2O$ containing 0.3 g $AgNO_3$, 1.93 g $Cu(NO_3)_2.3H_2O$, and 2.33 g $Ni(NO_3)_2.6H_2O$ and dried for 4 hours at 125° C. The dried sample was then treated with 6.3 g 91.96% $WO_3$ (as the ammonium salt) and dried overnight at 125° C. The resulting catalyst had a composition which may be represented as $Ag_{0.1}Cu_{0.45}Ni_{0.45}WO_x/Al_2O_3$ (10 wt % W).

EXAMPLE 4

A 10 g sample of $\gamma$-$Al_2O_3$ was impregnated with an aqueous solution containing 1.2 $Ni(NO_3)_2.6H_2O$ and 1.08 g ammonium paratungstate, dried overnight at 110° C., and calcined 4 hours at 400° C.

EXAMPLE 5

A 10 g sample of $\gamma$-$Al_2O_3$ was impregnated with an aqueous solution containing 3.62 g $Mn(NO_3)_2.6H_2O$, dried overnight at 110° C., and calcined 4 hours at 400° C.

In Examples 6–11, 20 cc of catalyst was placed into a quartz tube between quartz wool plugs, flushed well with nitrogen, heated to the initial run temperature under flowing nitrogen and kept under flowing nitrogen at this temperature for several hours. Following this pretreatment, hydrogen sulfide and carbon dioxide were introduced at a 1:1 molar ratio with a 10 second contact time. Following the initial run, additional runs were made at higher temperatures. The results of these runs are reported in Table I.

TABLE I
REACTION OF CARBON DIOXIDE AND HYDROGEN SULFIDE OVER VARIOUS CATALYSTS

| Example No. | Catalyst | Temperature (°C.) | COS Yield (%)[1] |
|---|---|---|---|
| 6 | Co MoO$_4$ | 200 | — |
| " | | 400 | 1.0 |
| " | | 500 | 4.0 |
| " | | 600 | 7.0 |
| 7 | Cs Cu$_{0.2}$ Zn$_{0.5}$ Mn$_{0.5}$ MoO$_x$/10 wt % Sn | 300 | — |
| " | | 400 | 7.0 |
| " | | 600 | 11.3 |
| 8 | Ag$_{0.1}$ Cu$_{0.45}$ Ni$_{0.45}$ WO$_x$ | 400 | 6.0 |
| | | 600 | 6.6 |
| 9* | Nalco 506 (NiO/MoO$_3$/Al$_2$O$_3$) | 400 | 7.0 |
| " | | 600 | 11.7 |
| 10 | Ni WO$_x$/Al$_2$O$_3$ | 400 | 6.8 |
| " | | 600 | 11.7 |
| 11 | Mn O$_x$/Al$_2$O$_3$ | 400 | 4.0 |
| " | | 600 | 9.7 |

*This was a commercially purchased catalyst.
[1]Based on moles of CO$_2$ fed to reactor.

Reaction II

In Examples 12-27, oxygen was introduced as air.

EXAMPLES 12-24

These Examples describe the oxidation of carbonyl sulfide over various bed packings. In each case, the bed packing occupied about 10 cc of a 12" quarts tube. The carbonyl sulfide/oxygen feed were introduced into the tube such that the feed was in contact with the bed material approximately 10 seconds. The molar feed ratio and temperature along with the carbonyl sulfide conversion and molar product ratio are reported in Table II.

EXAMPLE 25

To demonstrate the effect of the molar feed ratio on carbon monoxide selectivity, varying ratios of carbonyl sulfide and oxygen were introduced into a quartz tube (12" long, 13 mm internal diameter) that was heated to 350° C. and contained no bed packing, i.e. the reaction zone was an open tube. The flow rate was such that the residence time of the feed in the tube was approximately 10 seconds. The results are reported in Table III.

TABLE III

| COS/O$_2$ (Mole) | CO/CO$_2$ (Mole) | COS (Conv. (%)) |
|---|---|---|
| 0.63 | 0.6 | $\geq$90 |
| 1.0 | 4.1 | " |
| 1.2 | 7.8 | $\geq$80 |
| 1.25 | 7.6 | " |
| 1.3 | 10.8 | " |
| 1.4 | 10.8 | " |

EXAMPLE 26

To demonstrate the effect of temperature on carbonyl sulfide conversion, Example 25 was repeated except that the carbonyl sulfide/oxygen mole ratio was held constant at 1:1 while the temperature was varied. The results are reported in Table IV.

TABLE IV

| Temp (°C.) | COS Conv. (%) | CO/CO$_2$ (Mole) |
|---|---|---|
| 200 | 1 | — |
| 225 | 8 | traces |
| 250 | 74 | 7.5 |
| 275 | 81 | 8.1 |
| 300 | 77 | 8.2 |
| 350 | 83 | 6.9 |
| 400 | 90 | 5.0 |

EXAMPLE 27

To demonstrate the effect of contact time on carbonyl sulfide conversion, Example 25 was again repeated except the carbonyl sulfide:oxygen mole ratio was held constant at 1.4:1 and the contact time was

TABLE II
OXIDATION OF COS OVER VARIOUS BED PACKINGS

| Example | Bed Packing | Temp. (°C.) | COS/O2 (Mole) | COS Conv. (%) | CO/CO$_2$ (Mole) |
|---|---|---|---|---|---|
| 12 | $\gamma$-alumina* (extrudates) | 350 | 1 | 83 | 2.7 |
| 13 | glass beads* (3 mm dia.) | 400 | 1.4 | 56 | 16.5 |
| | (5 mm dia.) | 350 | 1.0 | 76 | 6.9 |
| 14 | glass wool* | 400 | 1.4 | 56 | 9.1 |
| 15 | quartz wool* | 400 | 1.4 | 51 | 7.5 |
| 16 | stainless steel wool* | 400 | 1.4 | 62 | 9.5 |
| 17 | SiO$_2$* (granular) | 400 | 1.4 | 52 | 8.0 |
| 18 | SiO$_2$/(CH$_3$)$_2$SiCl$_2$** (granular) | 350 | 1.4 | 8 | 2.3 |
| 19 | Porcelain* ($\frac{1}{4}$" saddles) | 350 | 1.4 | 53 | 9.8 |
| 20 | V$_1$S$_{1.2}$O$_x$ (coated on silica-alumina spheres to 13 wt %) | 350 | 1 | 91 | 1.4 |
| 21 | V$_1$P$_{1.2}$O$_x$ (coated on silica-alumina spheres to 14 wt %) | 400 | 1 | 92 | 4.1 |
| 22 | H$_3$Mo$_{12}$PO$_x$ (impregnated into $\gamma$-alumina extrudates to 10 wt %) | 300 | 1 | 78 | 0.27 |
| 23 | B$_2$O$_3$# (grand pellets) | 350 | 1 | 74 | 7.3 |
| 24 | CoCl$_2$ (impregnated into $\gamma$-alumina extrudates to 10 wt %) | 300 | 1 | 16 | 0.71 |

*Purchased.
**SiO$_2$ silylated with dimethyl dichlorosilane (5 wt % in toluene for 1 hour and subsequently dried at 200° C.).
Prepared by heating H$_3$BO$_4$ under He$_2$ for 1 hour at 350° C.

varied. Moreover, in runs a-d the quartz tube was packed with 10 cc of 3 mm diameter glass beads while runs e and f were made when the tube was open. The results are reported in Table V.

TABLE V

| Run | Contact Time (Sec) | COS Conv. (%) | $CO/CO_2$ (Mole) |
|---|---|---|---|
| a | 3 | 47 | 8.5 |
| b | 6 | 46 | 9.1 |
| c | 10 | 55 | 9.6 |
| d | 20 | 55 | 9.5 |
| e | 4 | 92 | 8.2 |
| f | 6 | 91 | 7.9 |

Although the invention has been described in considerable detail through the preceding examples, these examples are provided only for the purpose of illustration. Many variations and modifications can be made by one skilled in the art without departing from the spirit and scope of this invention as described in the appended claims.

What is claimed is:

1. A thermochemical method for producing hydrogen from hydrogen sulfide, the method comprising:
   (a) contacting hydrogen sulfide with carbon dioxide to form carbonyl sulfide and water,
   (b) contacting the carbonyl sulfide produced in (a) with oxygen to form carbon monoxide and sulfur dioxide, and
   (c) contacting the carbon monoxide produced in (b) with water to form carbon dioxide and hydrogen.

2. The process of claim 1 where step (a) is conducted in the vapor phase.

3. The process of claim 2 where step (a) is conducted at a temperature between about 20°–800° C. and at a pressure between about 0–3,000 psig.

4. The process of claim 2 where step (a) is conducted at a temperature between about 100°–700° C. and at a pressure between about 0–500 psig.

5. The process of claim 3 where step (b) is conducted at a temperature between about 200°–500° C. and at a pressure between about 0–1,000 psig.

6. The process of claim 3 where step (b) is conducted at a temperature between about 250°–350° C. and at a pressure between about 0–500 psig.

7. The process of claim 5 where in step (a) one of carbon dioxide and hydrogen sulfide is present in a molar excess.

8. The process of claim 5 where in step (a) carbon dioxide is present in a molar excess.

9. The process of claim 7 where the contacting in step (a) is conducted in the presence of an acidic catalyst.

10. The process of claim 9 where the acidic catalyst is at least one oxide or sulfide of a Group 6b or 7b metal.

11. The process of claim 10 where the acidic catalyst is promoted with at least one metal or metal compound of Group 7b, 8, 1a, 1 b and 2b.

12. The process of claim 9 where the catalyst is supported.

13. The process of claim 12 where the support is a gamma-alumina.

14. The process of claim 12 where step (a) is conducted in a fixed-bed reactor.

15. The process of claim 1 where all three steps are conducted in the vapor phase.

* * * * *